US008626148B2

(12) United States Patent
Lee et al.

(10) Patent No.: US 8,626,148 B2
(45) Date of Patent: Jan. 7, 2014

(54) TEXT MESSAGE TRANSMISSIONS INDICATING FAILURE OF RECIPIENT MOBILE DEVICE TO CONNECT WITH A CALL

(75) Inventors: Jae Han Lee, San Jose, CA (US); Anand Sethuraman, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/048,551

(22) Filed: Mar. 15, 2011

(65) Prior Publication Data

US 2012/0238251 A1     Sep. 20, 2012

(51) Int. Cl.
*H04M 11/00*     (2006.01)

(52) U.S. Cl.
USPC ....... 455/421; 455/41.2; 455/550.1; 455/466; 455/456.6; 455/422.1; 455/417; 455/420; 455/412.2; 455/404.2; 455/414.1; 370/237; 370/230.1; 370/328; 370/338

(58) Field of Classification Search
USPC ........ 455/456.1, 466, 422.1, 440, 404.2, 565, 455/458, 41.2, 456.3, 456.4, 46, 455/414.1–414.3, 421, 428, 550.1, 556.2, 455/552.1, 412.2; 379/164, 76, 179, 252, 379/263, 167.08
See application file for complete search history.

(56) References Cited

U.S. PATENT DOCUMENTS

| | | | |
|---|---|---|---|
| 5,920,607 A | 7/1999 | Berg | |
| 6,246,889 B1 | 6/2001 | Boltz et al. | |
| 6,393,272 B1 | 5/2002 | Cannon et al. | |
| 6,438,216 B1 | 8/2002 | Aktas | |
| 6,721,572 B1 * | 4/2004 | Smith et al. | 455/456.1 |
| 6,760,581 B2 | 7/2004 | Dutta | |
| 7,113,793 B2 | 9/2006 | Veerasamy et al. | |
| 7,133,503 B2 | 11/2006 | Revisky et al. | |

(Continued)

FOREIGN PATENT DOCUMENTS

| | | |
|---|---|---|
| EP | 1 296 501 | 3/2003 |
| WO | 99/31909 | 6/1999 |
| WO | WO-2009/012522 | 1/2009 |

OTHER PUBLICATIONS

"Digital cellular telecommunication system (Phone 2+); Point-to-Point (PP) Short Message Services (SMS) support on mobile radio interface (GSM 04.11)", GSM Technical Specification, Version 5.1.0, ETSI, Mar. 1996, pp. 1-90.

(Continued)

*Primary Examiner* — Vladimir Magloire
*Assistant Examiner* — Babar Sarwar
(74) *Attorney, Agent, or Firm* — Meyertons, Hood, Kivlin, Kowert & Goetzel, P.C.

(57) ABSTRACT

An originating communications device is configured to transmit a text message to a recipient mobile device when the originating device determines that the recipient device has failed to connect with a call that was initiated by the originating device. The text message is designed to indicate that the recipient device has failed to connect with the call; in addition or as an alternative, the text message includes a code that indicates to the recipient device that it is potentially in a poor RF coverage area. The recipient mobile device, upon receiving and displaying the text message, may determine that it is indeed in an area with poor coverage and will in response store its current geographic location as a poor coverage area. Other embodiments are also described and claimed.

13 Claims, 5 Drawing Sheets

(56) References Cited

U.S. PATENT DOCUMENTS

| | | | |
|---|---|---|---|
| 7,231,232 B2 | 6/2007 | Osann, Jr. | |
| 7,299,054 B2 | 11/2007 | Benco | |
| 7,587,032 B1 | 9/2009 | de Waal | |
| 7,778,652 B2 * | 8/2010 | Srey et al. | 455/458 |
| 2002/0142756 A1 | 10/2002 | Rutledge et al. | |
| 2003/0054865 A1 | 3/2003 | Byers et al. | |
| 2004/0203632 A1 | 10/2004 | Schaaf | |
| 2004/0264653 A1 | 12/2004 | Revisky et al. | |
| 2005/0008129 A1 | 1/2005 | Wullert, II | |
| 2005/0111646 A1 * | 5/2005 | Bishop et al. | 379/207.02 |
| 2005/0117714 A1 | 6/2005 | Chingon et al. | |
| 2005/0227740 A1 | 10/2005 | Orbach | |
| 2008/0259742 A1 | 10/2008 | Tadanori | |
| 2009/0022294 A1 | 1/2009 | Goldstein et al. | |
| 2009/0117892 A1 | 5/2009 | Nader | |
| 2009/0221274 A1 | 9/2009 | Venkatakrishnan et al. | |
| 2009/0239509 A1 | 9/2009 | Sennett et al. | |
| 2010/0260107 A1 | 10/2010 | Shuman | |
| 2011/0111735 A1 | 5/2011 | Pietrow | |
| 2011/0177800 A1 * | 7/2011 | Gilson | 455/417 |
| 2011/0292808 A1 * | 12/2011 | Stephens | 370/237 |

OTHER PUBLICATIONS

"Digital cellular telecommunications system (Phase 2+); Teleservices supported by a GSM Public Land Mobile Network (PLMN) (GSM 02.03)", GSM Technical Specification, Version 5.1.0, ETSI, Jul. 1996, pp. 1-106.

"Digital cellular telecommunications systems (Phase 2+); Technical realization of the Short Message Service (SSM) Point-to-Point (PP) (GSM 03.40)", GSM Technical Specification, Version 5.1.0, ETSI, Mar. 1996, pp. 1-24.

Trosby, Finn, "SMS, the strange duckling of GSM", Telektronikk Mar. 2004, pp. 187-194.

PCT International Search Report and Written Opinion of the International Searching Authority, issued Jun. 9, 2011, PCT/US2010/055504, filed Nov. 4, 2010, 18 pages.

Partial International Search Report of the International Searching Authority, issued Feb. 28, 2011, PCT/US2010/055504, filed Nov. 4, 2010, 5 pages.

* cited by examiner

TEXT MESSAGE TRANSMISSIONS INDICATING FAILURE OF RECIPIENT MOBILE DEVICE TO CONNECT WITH A CALL

An embodiment of the invention relates to identifying poor coverage areas in a wireless cellular network. Other embodiments are also described.

BACKGROUND

Mobile communications involve the exchange of radio frequency (RF) signals between a mobile device and a base station. When these RF signals are blocked or degraded, a call placed to the mobile device cannot be completed or connected, because the base station is unable to establish a communication link to the mobile device in response to a call origination request from another communications device. The base station may be unable to establish the communication link to the mobile device for various reasons. For example, the control signals for call setup that are transmitted from the base station to the mobile device may be blocked, reflected, absorbed, or attenuated before they reach the mobile device.

When a base station is unable to establish a communication link to a recipient mobile device, the recipient device will not ring. Thus, it will not provide any indication to its user that it had failed to connect with an incoming call as a result of poor coverage, unless a user of an originating communications device leaves a voicemail or a callback number (when prompted to do so by a pre-recorded carrier message). If the user of the originating device decides to not leave a voicemail or a callback number, her other option may be to try calling again in a few minutes. However, she may simply forget to call again altogether. In that situation, the user of the recipient device may never know that he had missed a call from the user of the originating device.

SUMMARY

In accordance with the embodiments of the invention, an originating (near-end user's) communications device may send a text message to a recipient (far-end user's) mobile device to alert the far-end user that the recipient device is likely in a poor radio frequency (RF) coverage area. When the originating device initiates a call with the recipient device and the recipient device fails to connect with the call, the originating device may automatically determine that the recipient device is likely in an area with poor RF coverage, by virtue of its failure to connect with the call. The originating device may generate a text message that indicates the failure of the recipient device to connect with the call. The originating device then transmits the text message to the recipient device. Once received by the recipient device, the display of this text message may prompt the far-end user to call the near-end user back, without requiring the near-end user to leave a voicemail.

In another embodiment, a recipient mobile device may store its geographic location as a poor RF coverage area in response to receiving a text message from an originating communications device that indicates the recipient device may be in a potentially poor RF coverage area. After the recipient device receives the text message and determines that the text message is a poor RF coverage alert, the recipient device may determine that it is receiving a weak RF signal and in that case determines its current geographic location. The recipient device then stores the geographic location as a poor RF coverage area. This may enable the user of the recipient device to anticipate poor RF coverage when the user approaches an area indicated by the stored geographic location. The user can then determine appropriate actions to take before the user reaches the area of poor RF coverage.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Embodiments of the invention will now be described with reference to the drawings summarized below. The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
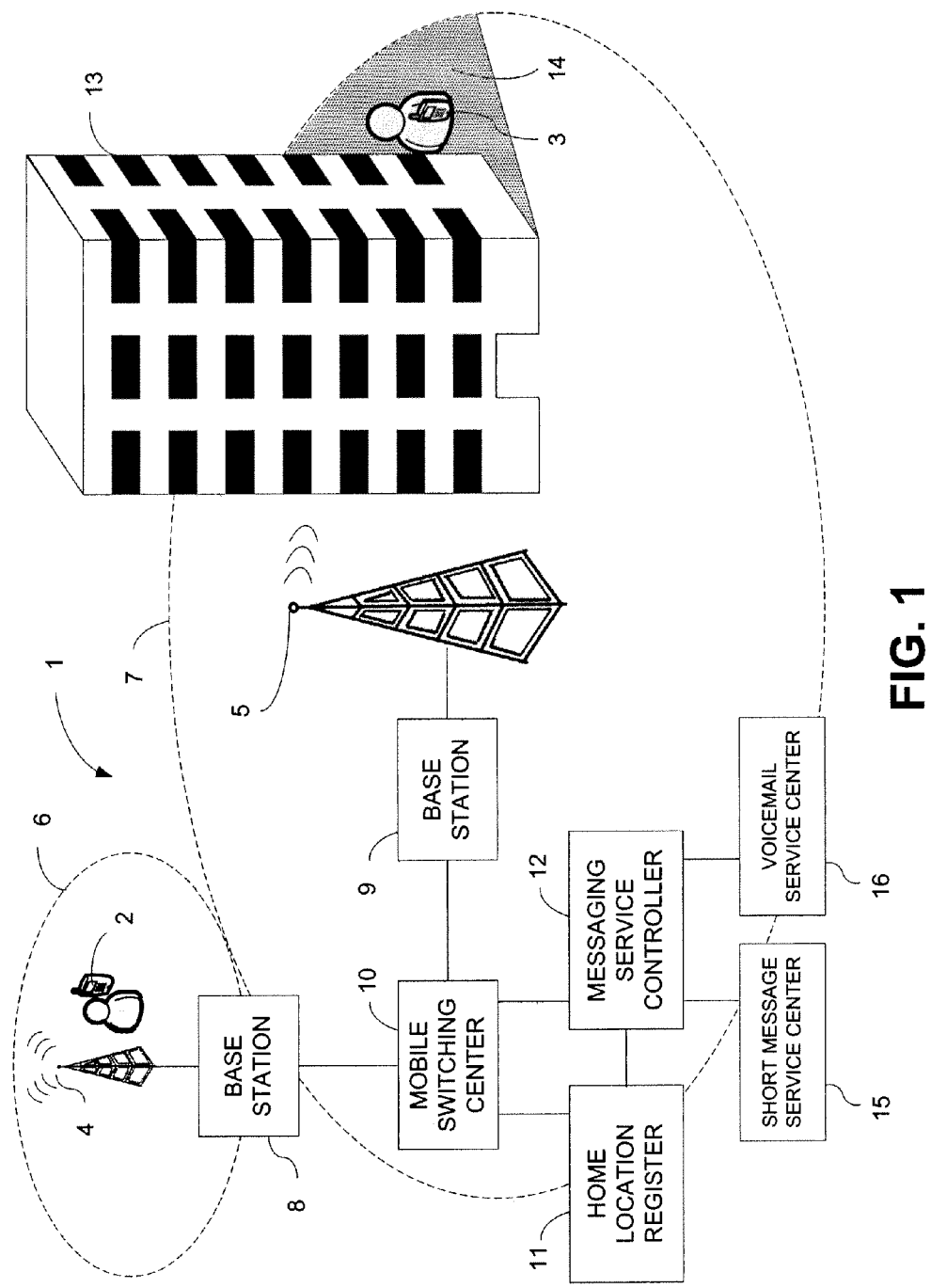
FIG. 1 illustrates an example mobile communications system.

FIG. 1 shows an example of a mobile communications system. The system may include an originating communications device 2 (i.e., a device which initiates a communications request) and a recipient mobile device 3 (i.e., a mobile device to which the communications request is targeted). Although the system may include several originating devices 2 and recipient devices 3, only one of each is shown in FIG. 1 to simplify the drawing. Originating device 2 and recipient device 3 may include any suitable device for sending and receiving communications requests and participating in communications interactions. For example, the mobile devices 3 may include a cellular telephone, a smart phone, or any other portable wireless device that is capable of two-way real-time voice communications or "calls," such as voice calls and video calls. The originating communications device 2 may also be a mobile device.

The originating device 2 communicates with the recipient device 3 through a wireless communications network 1. The network 1 supports calls and other traffic, such as text messaging, to and from mobile communications devices. Any suitable circuitry, software, device, system, or a combination of these (e.g., a wireless communications infrastructure including cellular network communications towers or base stations, and telecommunications servers and switches) operative to create a communications network may be used to create the network 1. The network 1 may be configured in accordance with any technology suitable for mobile communications such as General Packet Radio Service (GPRS), Global System for Mobile Communications (GSM), Code Division Multiple Access (CDMA), Universal Mobile Telecommunications System (UMTS), Integrated Dispatch Enhanced Network (iDEN), 3G technologies, etc. In some embodiments, the network 1 may also support traditional telephone lines (Plain Old Telephone System, POTS), voice over wireless local area network or WiFi (e.g., a IEEE 802.11 protocol), high frequency systems (e.g., 900 MHz, 2.4 GHz, and 5.6 GHz communications systems), infrared, other relatively localized wireless communication protocol, or any combination thereof.

The wireless network 1 may include a base station 9 with an associated antenna 5, a base station 8 with an associated antenna 4, a mobile switching center 10, a messaging service controller 12, a Short Message Service Center (SMSC) 15, a voicemail service center 16, and a home location register (HLR) 11. The base station 9 and the antenna 5 provide wireless network coverage for a particular coverage area referred to as a cell 7. The base station 8 and the antenna 4 provide wireless network coverage for a cell 6. The wireless network 1 transmits communication signals to and receives communication signals from mobile devices within the cell 7 via the antenna 5 and within the cell 6 via the antenna 4. Those skilled in the art will appreciate that a wireless network in actual practice may include hundreds of cells, each served by an antenna, depending upon an overall expanse of network coverage. All pertinent components may be connected by multiple switches and routers (not shown) and controlled by multiple network controllers.

The messaging service controller 12 routes voicemail messages to the voicemail service center 16 and text messages to the SMSC 15. The base station 9 communicates with the messaging service controller 12 by a network, such as the Internet and/or a POTS (plain ordinary telephone system) via the mobile switching center 10. Typically, the Internet connection between the messaging service controller 12 and the mobile switching center 10 transfers data, and the POTS connection transfers voice information. The base station 9 may transmit and receive text messages from mobile devices such as the recipient device 3, and the base station 8 may transmit and receive text messages from mobile devices such as the originating device 2, by short message service (SMS) or other known over-the-air methods. The phrase "text message" as used here generically refers to brief alphanumeric content that can be exchanged between an originating fixed-line or landline phone or a mobile phone, and a mobile phone (over a network). This may be in accordance with a Short Message Service (SMS) protocol or a Multimedia Message Service (MMS) protocol.

In GSM technology, an SMS text message is sent to and from a mobile device over a control channel. When the mobile device is in idle mode (i.e., the mobile device is not currently connected to a call), a Standalone Dedicated Control Channel (SDCCH) may be used for sending SMS text messages to and from the mobile device. The SDCCH is a much lower bandwidth channel than a traffic channel (TCH) which is used for transferring data during a voice call. The probability of receiving an SMS text message is therefore greater than receiving a voice call.

The HLR 11 is a database that stores records corresponding to mobile devices that are authorized to use the network 1. The HLR 11 provides initial log-on registration, authentication, and billing support. For each mobile device, the HLR 11 stores the location of a cell that is currently serving the mobile device. The mobile switching center 10 determines the routing of calls and traffic to mobile devices based on an inquiry to the HLR 11.

In the embodiment shown in FIG. 1, the originating device 2 is within the cell 6 served by the antenna 4. The recipient device 3 is within the cell 7 served by the antenna 5. Within the cell is a building 13 that is located between the recipient device 3 and the antenna 5. The building 13 is oriented and constructed such that it degrades the RF signals transmitted between the recipient device 3 and the antenna 5, resulting in a RF degradation zone 14. In this case, a call (which may be any two-way communication such as a voice call or a video call) placed to the recipient device 3 may have a substantial likelihood of not being completed, i.e., the network 1 may not be able to establish a communication link (also referred to as a connection) to the recipient device 3 in response to a call initiation request. However, the RF signals transmitted from the antenna 5 to the recipient device 3 may be such that the recipient device 3 may still be able to receive text messages.

Figure 2:
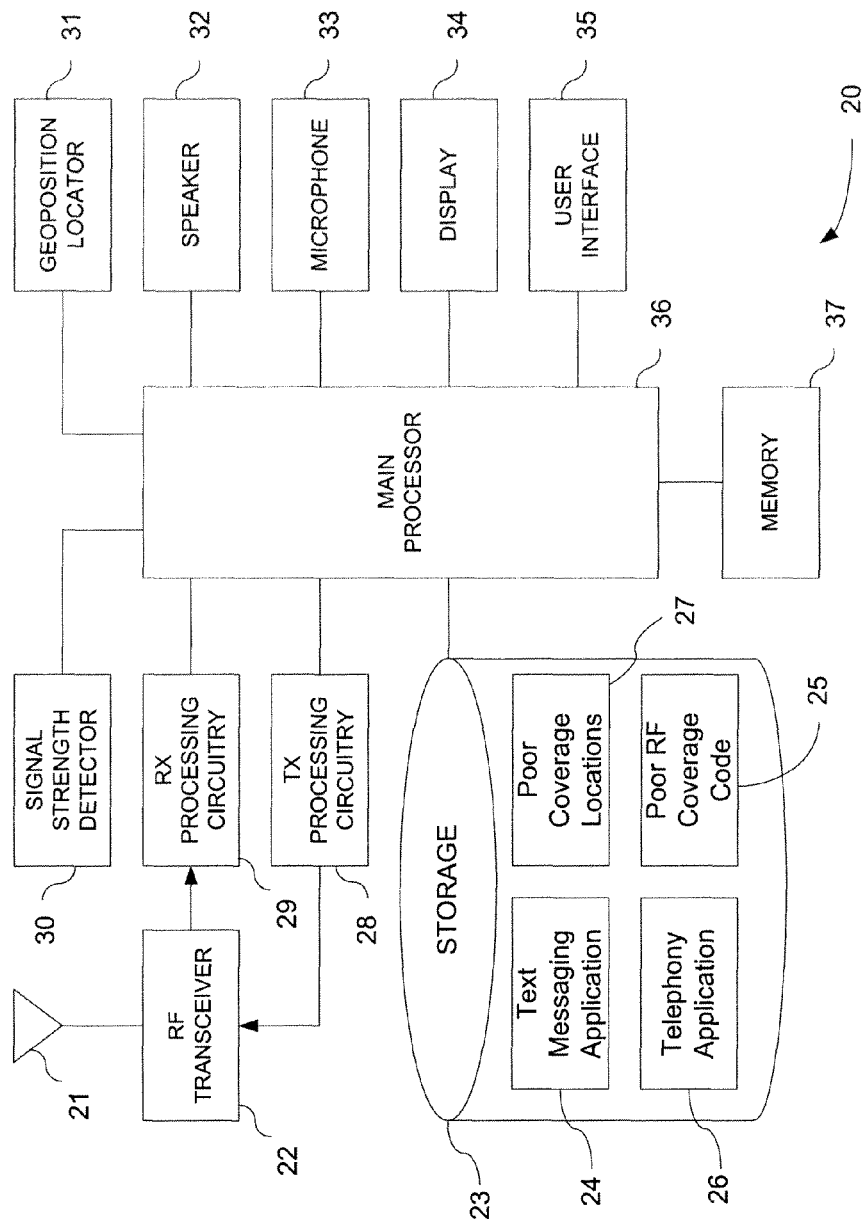
FIG. 2 is a block diagram of an example mobile device.

FIG. 2 is a block diagram of an example mobile device 20 according to an embodiment of the invention. Both originating device 2 (FIG. 1) and recipient device 3 (FIG. 1) may include some or all of the components of mobile device 20. The mobile device 20 is a portable wireless two-way communications device having at least voice and data communication capabilities, such as a cellular telephone, a smart phone, or any other portable device with similar wireless communication capabilities. The mobile device 20 includes components such as an antenna 21, a RF transceiver 22, receiving (RX) processing circuitry 29, and transmission (TX) processing circuitry 28. The mobile device 20 also includes a main processor 36 that interacts with a signal strength detector 30, a geoposition locator 31, memory 37, storage 23, a speaker 32, a microphone 33, a display 34, and a user interface 35. In addition to the speaker 32 and the display 34, mobile device 20 may include other output mechanisms, e.g., hardware to cause the device to vibrate or flashing LED lights. The various components of the mobile device 20 may be digitally interconnected and used or managed by a software stack being executed by the main processor 36. Many of the components shown or described here may be implemented as one or more dedicated hardware units and/or a programmed processor (software being executed by a processor, e.g., the main processor 36).

RF transceiver 22 receives, from antenna 21, an incoming RF signal transmitted by a base station of a wireless communication network. RF transceiver 22 may down-convert the incoming RF signal to produce a baseband signal. The baseband signal is sent to RX processing circuitry 29 that produces a processed baseband signal by filtering, decoding, and/or digitizing the baseband signal. RX processing circuitry 29 provides the processed baseband signal to the processor 36. The processor 36 may transmit the processed baseband signal to the speaker 32 (e.g., voice communications) or perform further processing of the processed baseband signal for display to the user (e.g., data communications such as text messaging and web browsing). The processor 36 may also transmit the processed baseband signal to the signal strength detector 30.

TX processing circuitry 28 receives voice data or other outgoing baseband data (e.g., web data, email, text message) from the processor 36. TX processing circuitry 28 may encode, multiplex, and/or digitize the outgoing baseband data to produce a processed baseband signal. RF transceiver 22 receives the outgoing processed baseband signal and may up-convert the baseband signal to an RF signal that is transmitted via antenna 21.

The signal strength detector 30 monitors and processes the strength of a received RF signal from a base station. If the signal strength falls below a certain threshold, the processor 36 performs certain actions related to seamless mobility. The processor 36 also uses the information from the signal strength detector 30 to update a received signal strength indicator (RSSI) that is displayed to a user as an RSSI icon via the display 34. The RSSI icon is modified whenever the received signal changes in level, for example when it rises or falls beyond predefined levels. This may be done by changing the number of bars or height of a bar in the RSSI icon.

The geoposition locator 31 enables the mobile device 20 to determine its current geographic position. Such position may be obtained by a global positioning system (GPS). Using a GPS, the mobile device 20 can ascertain its present geographic location (latitude, longitude, and altitude), by the detection and processing of signals from geo-synchronous satellites. The mobile device 20 may use other alternative systems to determine its geographic location, such as line-of-sight, dead reckoning, wireless triangulation, or an equivalent location determination system.

The main processor 36 controls the overall operation of the mobile device 20 by performing some or all of the operations of one or more applications implemented on the mobile device 20, by executing instructions for it (software code and data) that may be found in the storage 23. The processor may, for example, drive the display 34 and receive user inputs through the user interface 35 (which may be integrated with the display 34 as part of a single, touch sensitive display panel on the front face of the mobile device 20). The main processor 36 may also control the reception of forward channel signals and the transmission of reverse channel signals by the RF transceiver 22, the RX processing circuitry 29, and the TX processing circuitry 28. The main processor 36 may also control and/or interface with the geoposition locator 31 to obtain the location of the mobile device 20 and transfer the location to storage 23. In addition, the processor may perform various operations related to call processing and text messaging.

Storage 23 provides a relatively large amount of "permanent" data storage, using nonvolatile solid state memory (e.g., flash storage) and/or a kinetic nonvolatile storage device (e.g., rotating magnetic disk drive). Storage 23 may include both local storage and storage space on a remote server. Storage 23 may store data, such as poor coverage locations 27, and other software components that control and manage, at a higher level, the different functions of the mobile device 20. For instance, there may be a telephony application 26 that configures a built-in touch sensitive display to look like the keypad of a traditional telephony handset, and allows the user to enter a telephone number to be called, or select a previously stored number from a telephone address book. The telephony application 26 may register the media device as a cellular handset with the nearest cellular base station (using the appropriate cellular communications protocols built into the mobile device 20). The application then proceeds to allow the user to make a call, and controls the built-in microphone 33 and earpiece speaker 32 to enable the user to experience a two-way conversation during the call. Another application may be a text messaging application 24 that would allow the user to send and receive text messages through the user interface 35 and display 34.

In addition to storage 23, there may be memory 37, also referred to as main memory or program memory, which provides relatively fast access to stored code and data that is being executed by the main processor 36. Memory 37 may include solid state random access memory (RAM), e.g., static RAM and dynamic RAM. There may be one or more processors, e.g., main processor 36, that run or execute various software programs, modules, or sets of instructions (e.g., applications) that, while stored permanently in the storage 23, have been transferred to the memory 37 for execution, to perform the various functions described above. It should be noted that these modules or instructions need not be implemented as separate programs, but rather may be combined or otherwise rearranged in various combinations. In addition, the enablement of certain functions could be distributed amongst two or more modules, and perhaps in combination with certain fixed hardware components that contain hardwired logic.

Figure 3:
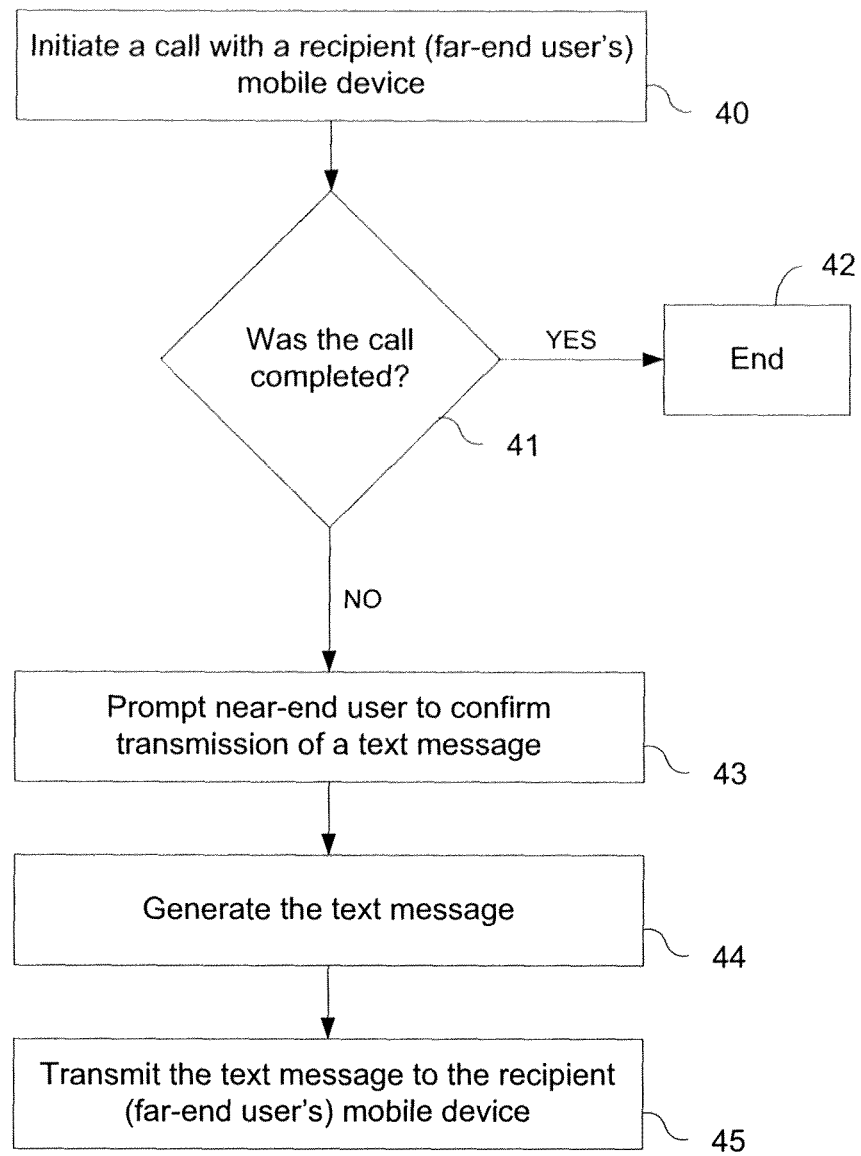
FIG. 3 is a flowchart showing the operations performed in an originating communications device for generating a text message alert.

FIG. 3 shows a flowchart of operations that may be performed by the originating device 2 of FIG. 1 according to an embodiment of the invention. A user of the originating device 2 (near-end user) initiates a call to the recipient (far-end user's) mobile device 3 (in block 40) by, for example, dialing or retrieving a phone number of the recipient device 3 and pressing a send button. The base station 8 receives from the originating device 2 the request to initiate the call with the recipient device 3. When the base station 8 receives the request, it transmits the request to the mobile switching center 10 which queries the HLR 11 for the current location of the recipient device 3.

According to the embodiment shown in FIG. 1, the mobile switching center 10 may recognize that the recipient device 3 is within the cell served by the antenna 5 and the base station 9 based on an inquiry to the HLR 11. The mobile switching center 10 routes the call initiation request to the base station 9. The base station 9 communicates with the recipient device 3 over a control channel to establish a communication link over a TCH for connecting the call. If a communication link between the base station 9 and the recipient device 3 is established, the call is completed (i.e., the recipient device 3 successfully connected with the call). The originating device 2 determines that the recipient device 3 has successfully connected with the call (in block 41), and the process shown in FIG. 3 ends (in block 42). The originating device 2 may determine that the recipient device 3 connected with the call by, for example, detecting a predetermined, minimum number of rings before the call is answered, by being either "picked up" by the far-end user or routed to voicemail. The originating device 2 may also determine that the recipient device 3 has connected with the call, by detecting speech of the near-end user with its microphone, within a specified period of time after the call is answered.

If the recipient device 3 does not receive the control signal from the base station 9 or if a communication link over a TCH cannot be established between the base station 9 and the recipient device 3, the call cannot be completed (i.e., the recipient device 3 has failed to connect with the call). A call may also fail to complete when the base station 9 determines that the recipient device 3 is not currently registered with the network 1 (i.e., the recipient device 3 is currently not powered on or is not within any RF coverage area). Because no RF traffic channel is available for connecting the call to the recipient device 3, the call cannot be completed. The originating device 2 determines that the recipient device 3 has failed to connect with the call (in block 41) by, for example, detecting no rings or too few rings (fewer than the predetermined minimum), before the call is routed to the voicemail of the far-end user or a pre-recorded carrier message (e.g., a previously determined audible voice or tones) is played back, or detecting a non-audible code sent by the network 1 indicating that a communication link to the recipient device 3 could not be established.

When the originating device 2 determines that the recipient device 3 has failed to connect with the call, the originating device 2 generates a text message that indicates a failure of the recipient device 3 to connect with the call (in block 44). Before generating the text message, the originating device 2 may prompt the near-end user to confirm that the text message is to be sent to the recipient device 3 (in block 43). Alternatively, the originating device 2 may generate the text message without prompting the near-end user. The text message may include information that indicates the recipient device 3 missed the call from the originating device 2. The text message may alternatively, or in addition, include a code that indicates the recipient device 3 is currently in an area of potentially poor RF coverage. After generating the text message, the originating device 2 transmits the text message to the recipient device 3 via the network 1 (in block 45).

When the base station 8 receives the text message from the originating device 2, the text message may be forwarded to the SMSC 15. If the recipient device 3 is currently registered, the SMSC 15 identifies the base station that is serving the recipient device 3 based on an inquiry to the HLR 11 and routes the text message to the base station 9 which transmits the text message to the recipient device 3 on a control channel (e.g., the SDCCH) that is established between the antenna 5 and the recipient device 3. If the recipient device 3 is currently not registered, the SMSC 15 may store the text message until the recipient device 3 registers with the network 1 or until a specified period of time has elapsed. When the recipient device 3 registers with the network 1, the SMSC 15 will transmit the text message to the mobile switching center 10 via the messaging service controller 12. The mobile switching center 10 then routes the message to the base station 9. The base station 9 then transmits the text message to the recipient device 3 on a control channel (e.g., the SDCCH). If the recipient device 3 does not register with the network before a specified period of time has elapsed, the text message may be cleared from the SMSC 15 without being transmitted to the recipient device 3.

Because the base station 9 is unable to establish a communication link over a traffic channel to the recipient device 3 to complete the call, the base station 9 cannot instruct the recipient device 3 to play a ringtone to announce the call. The user of the recipient device 3 thus generally receives no indication that she had missed a call. However, the recipient device 3 may still be able to receive the text message because the signal strength required to transmit a text message over the control channel is less than that needed to establish and maintain a call over a traffic channel. In another example, the recipient device 3 may be in an area where the RF signal received by the recipient device 3 fluctuates, e.g., perhaps due to movement of the recipient device 3, such that the recipient device 3 may be unable to connect to the call due to insufficient RF signal at the time the call was initiated but may shortly thereafter have sufficient RF signal to be able to receive the text message (e.g., when the recipient device 3 reestablishes a connection to the network 1). Thus, even though the recipient device 3 is located in a "poor RF coverage area," the recipient device 3 may still receive the text message. The poor RF coverage area includes the current location of the recipient device which has sufficient RF signal for receiving text messages by may or may not have sufficient RF signal for receiving a call.

Figure 4:
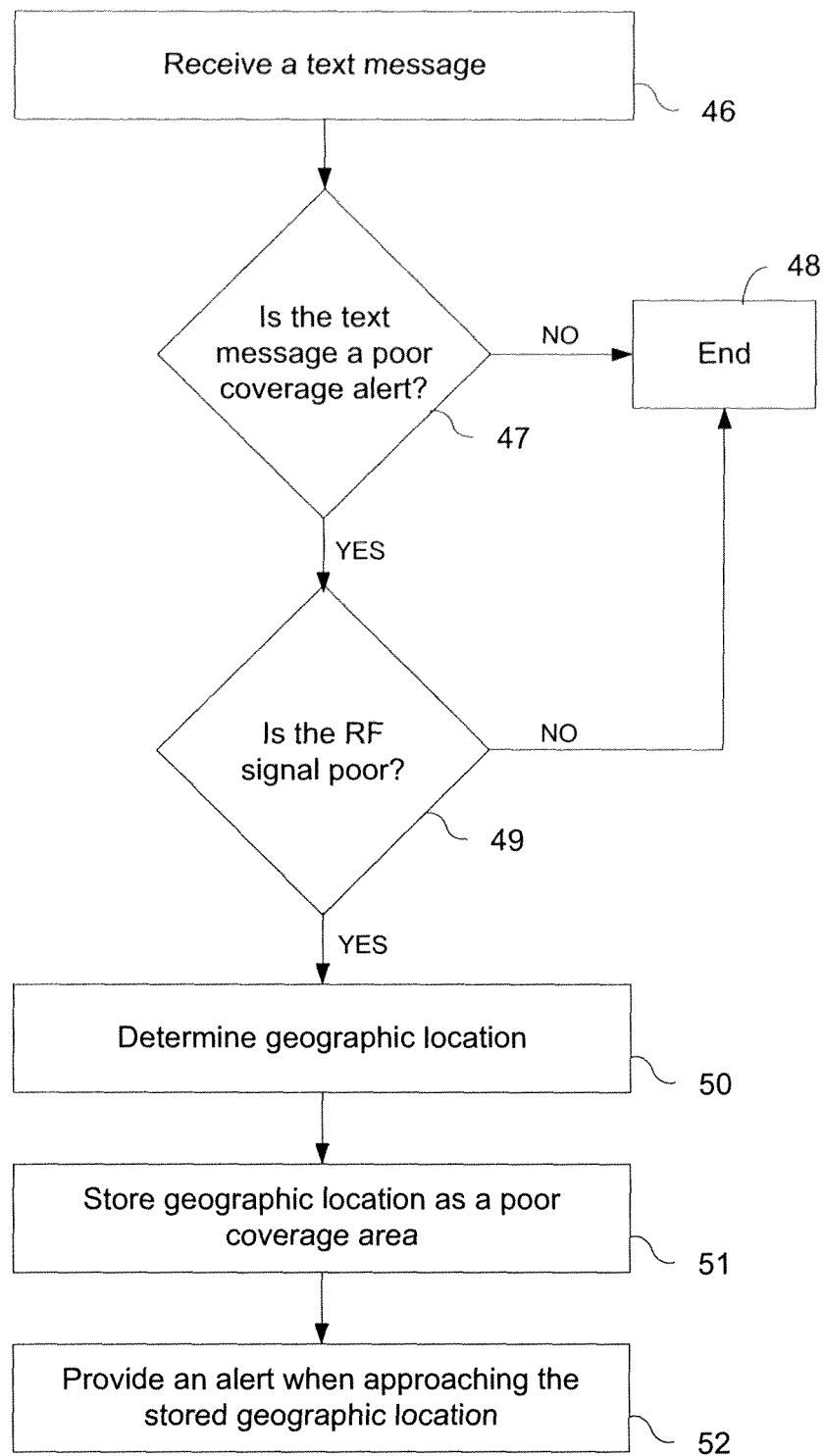
FIG. 4 is a flowchart showing the operations performed in a recipient mobile device when it receives a text message alert.

FIG. 4 shows a flowchart of operations that may be performed by the recipient mobile device 3 of FIG. 1 according to an embodiment of the invention. The recipient device 3 receives a text message from the base station 9 on a control channel established between the recipient device 3 and the antenna 5 (in block 46). In response to receiving the text message, the recipient device 3 determines whether the text message is a poor RF coverage alert (in block 47). The recipient device 3 may make this determination by, for example, parsing the text message and detecting a predetermined code 25 (See FIG. 2) that is included in the text message and that indicates the recipient device 3 is currently in a potentially poor RF coverage area. If the recipient device 3 determines that the text message is not a poor RF coverage alert, the process shown in FIG. 4 ends (in block 48).

If the recipient device 3 determines that the text message is a poor RF coverage alert, the recipient device 3 then determines the strength of the RF signal that is received from the antenna 5 (in block 49) using a signal strength detector. The recipient device 3 may determine the signal strength by measuring an instantaneous value of the signal strength or by measuring the signal strength over a period of time. If the signal strength does not drop below a predetermined threshold, the recipient device 3 is not currently in an area of poor RF coverage, and the process shown in FIG. 4 ends (in block 48).

If the signal strength does drop below a predetermined threshold, the recipient device 3 may currently be in an area of poor RF coverage. In response to determining that it is in a poor RF coverage area, the recipient device 3 determines its current geographic location (in block 50) using a geoposition locator. The recipient device 3 stores this location as a poor RF coverage area (in block 51).

When the recipient device 3 later approaches the area that is indicated by the stored location (by comparing newly generated geographic location parameters to the stored location parameters), the recipient device 3 may provide a warning alert so that the user of the recipient device 3 can take appropriate action (in block 52). The warning alert may be provided to the user audibly, textually, visually, and/or haptically. For example, if the user is operating the recipient device 3 to make a call while in a poor coverage area, the recipient device 3 may provide an audible alert to the user. The audible alert may be a tone to alert the user or an audio recording informing the user that she is currently in an area of poor RF coverage. The user can then decide whether to postpone making the call until she leaves the area of poor RF coverage. As another example, the recipient device 3 may vibrate and/or provide visual cues such as flashing lights or a symbolic icon when the user of the recipient device 3 is near a poor coverage area.

Figure 5:
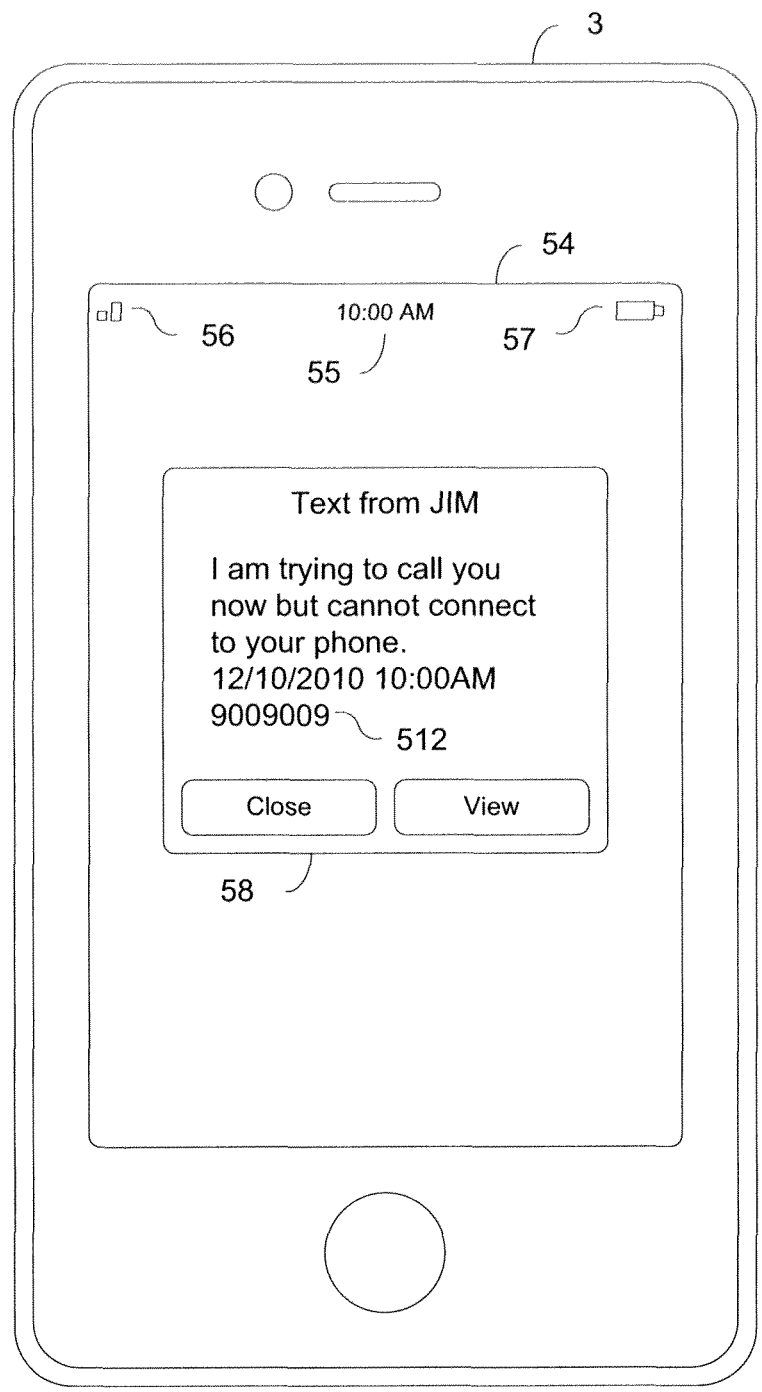
FIG. 5 shows an example of a text message alert.

FIG. 5 shows an example of a text message alert 58 that is sent from the originating device 2 and displayed by the recipient device 3 according to an embodiment of the invention. The recipient device 3 may include a display screen 54. The display screen 54 may present various types of information to the user, such as an RSSI icon 56, a battery indicator 57, the current time 55, and the text message alert 58. Additionally, the display screen 54 may also be combined with a user interface component such as a touch screen. The recipient device 3 may also include one or more physical buttons and/or virtual buttons (on the touch screen).

The text message alert 58 may be presented to the user of the recipient device 3 through the display screen 54. The text message alert 58 may include a code 512 that indicates the recipient device 3 is currently in a potentially poor RF coverage area. The recipient device 3 may parse a received text message to determine if the code 512 is present. If the code 512 is present, the received text message is a text message alerting the user of the recipient device 3 that it is currently in a potentially poor RF coverage area. The text message alert 58 may also include information that indicates the recipient device 3 missed a call from the originating device 2. For example, the text message may include a date and time that the text message alert 58 was created by the originating device 2. The text message alert 58 may also include a notification such as "I am trying to call you now but cannot connect to your phone." The text message alert 58 includes a signature that is used by the recipient device 3 to identify the originating device 2. For example, such information may include names, contact information (e.g., phone number), device identification code, and any other types of appropriate identification information.

For purposes of explanation, specific embodiments of the invention have been described to provide a thorough understanding of the present invention. These should not be construed as limiting the scope of the invention but merely as illustrating different examples and aspects of the invention. It should be appreciated that the scope of the invention includes other embodiments not discussed in detail above. Various other modifications, changes, and variations which will be apparent to those skilled in the art may be made in the arrangement, operation, and details of the systems and methods of the present invention disclosed herein without departing from the spirit and scope of the invention as defined in the appended claims. For instance, the originating device 2 is depicted in FIG. 1 as a mobile device; however, it may alternatively be a landline-based unit such as a desktop personal computer running a VoIP telephony application program that is linked with a text messaging application program. Therefore, the scope of the invention should be determined by the claims and their legal equivalents. Such equivalents include both currently known equivalents as well as equivalents developed in the future, i.e., any elements developed that perform the same function, regardless of structure. Furthermore, no element, component, or method step is intended to be dedicated to the public regardless of whether the element, component, or method step is explicitly recited in the claims.

What is claimed is:

1. A method performed by an originating mobile communications device, comprising:
   initiating, by the or mobile communications device, a call with a recipient mobile device;
   determining, by the originating mobile communications device, that the recipient mobile device has failed to connect with the call;
   in response to said determining, automatically generating, by the originating mobile communications device, a text message indicating said failure of the recipient mobile device to connect with the call, wherein said automatically generating the text message is performed without prompting a user of the originating mobile communications device; and
   transmitting, by the originating mobile communications device, the text message to the recipient mobile device.

2. The method of claim 1, wherein determining that the recipient mobile device has failed to connect with the call comprises:
   detecting no rings before the call is routed to one of a voicemail of a user of the recipient mobile device and a pre-recorded carrier message.

3. The method of claim 1, wherein determining that the recipient mobile device has failed to connect with the call comprises:
   detecting too few rings before the call is routed to one of a voicemail of a user of the recipient mobile device and a pre-recorded carrier message.

4. The method of claim 1, further comprising:
   prompting a user of the originating mobile communications device to confirm, before transmitting the text message.

5. The method of claim 1, wherein the text message includes a code that indicates the recipient mobile device is in an area of potentially poor radio frequency signal coverage.

6. An originating mobile communications device, comprising:
   communications circuitry to transmit a request to initiate a call with a recipient mobile device;
   a call processing controller to determine that the recipient mobile device has failed to connect with the call; and
   a text messaging controller to automatically generate a text message, without receiving input from a user of the originating mobile communications device, in response to the determination that the recipient mobile device has failed to connect with the call;
   the communications circuitry to transmit the text message to the recipient mobile device to notify a user of the recipient mobile device regarding radio frequency (RF) coverage of the recipient mobile device.

7. The originating mobile communications device of claim 6, further comprising:
   a user interface to prompt a user of the originating mobile communications device to confirm, before transmitting the text message.

8. The originating mobile communications device of claim 6, wherein the call processing controller determines that the call failed to complete by determining no rings before the call is routed to one of a voicemail of a user of the recipient mobile device and a prerecorded carrier message.

9. The originating mobile communications device of claim 6, wherein the call processing controller determines that the call failed to complete by detecting too few rings before the call is routed to one of a voicemail of a user of the recipient mobile device and a pre-recorded carrier message.

10. The originating mobile communications device of claim 6, wherein the text messaging controller includes in the text message a predetermined code that indicates a type of RF coverage area in which the recipient mobile device is located.

11. The originating mobile communications device of claim 6, wherein the call processing controller determines that the recipient device has failed to connect with the call by detecting that an RF communication link to the recipient mobile device cannot be established.

12. An article of manufacture, comprising:
   a non-transitory machine-readable medium containing stored program instructions, wherein the program instructions are executable by a processor of an originating mobile communications device to:
   initiate a call with a recipient mobile device;
   determine that the recipient mobile device has failed to connect with the call; and
   in response to said determining:
      automatically generate, without receiving input from the user of the originating mobile communications device, a text message that indicates said failure of the recipient mobile device to connect with the call; and
      prompt a user of the originating mobile communications device to confirm that the text message is to be transmitted to the recipient mobile device.

13. The article of manufacture of claim 12, wherein the non-transitory machine-readable medium contains additional stored instructions that program the originating mobile communications device to include in the text message a predetermined code that indicates the recipient mobile device is in an area of potentially poor radio frequency coverage.

* * * * *

UNITED STATES PATENT AND TRADEMARK OFFICE
CERTIFICATE OF CORRECTION

| | | |
|---|---|---|
| PATENT NO. | : 8,626,148 B2 | Page 1 of 1 |
| APPLICATION NO. | : 13/048551 | |
| DATED | : January 7, 2014 | |
| INVENTOR(S) | : Jae Han Lee and Anand Sethuraman | |

It is certified that error appears in the above-identified patent and that said Letters Patent is hereby corrected as shown below:

In the Claims:

Claim 1, Column 9, Line 34, please delete "or" and substitute -- originating --

Signed and Sealed this
Twenty-fifth Day of March, 2014

Michelle K. Lee
*Deputy Director of the United States Patent and Trademark Office*